W. C. SHEPARD.
HOSE JACKET.
APPLICATION FILED OCT. 1, 1908.

948,772.

Patented Feb. 8, 1910.

WITNESSES:
H. L. Sprague
R. M. Mowry

INVENTOR,
W. C. Shepard.
BY
ATTORNEY.

UNITED STATES PATENT OFFICE.

WILLIAM C. SHEPARD, OF PITTSFIELD, MASSACHUSETTS.

HOSE-JACKET.

948,772.  Specification of Letters Patent.  Patented Feb. 8, 1910.

Application filed October 1, 1908. Serial No. 455,688.

*To all whom it may concern:*

Be it known that I, WILLIAM C. SHEPARD, a citizen of the United States of America, and resident of Pittsfield, in the county of Berkshire and State of Massachusetts, have invented certain new and useful Improvements in Hose-Jackets, of which the following is a full, clear, and exact description.

This invention relates to a device sometimes designated as a hose jacket for closing broken or ruptured places in a hose, occasioned by the bursting of the latter; and the object is to provide a device of the character indicated which is simple and inexpensive of construction, convenient both in its application around the hose to stop a leak and also in its removal from the hose and entirely efficient in its leak closing operation.

The invention consists in the combination and arrangement of parts and the particular construction of certain of the parts all substantially as hereinafter described in conjunction with the accompanying drawings, and set forth in the claims.

Figure 1:
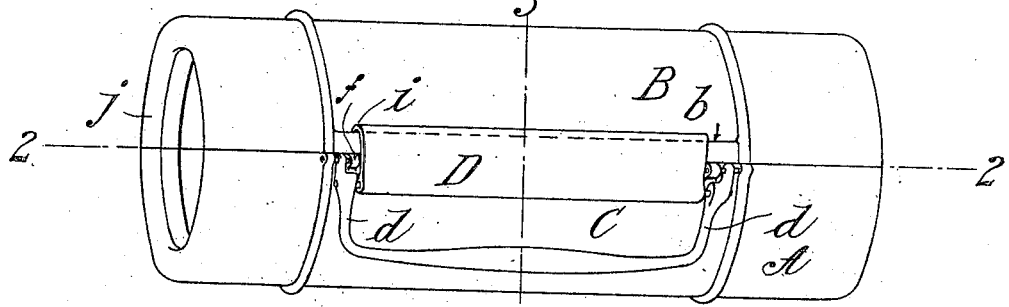
Figure 2:
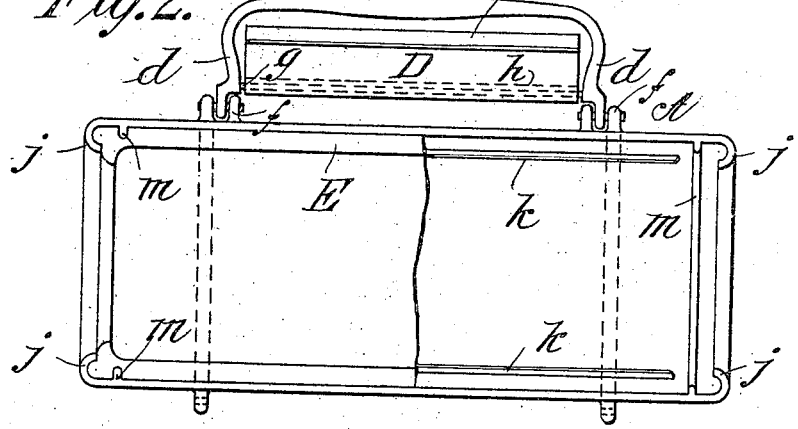
Figure 3:
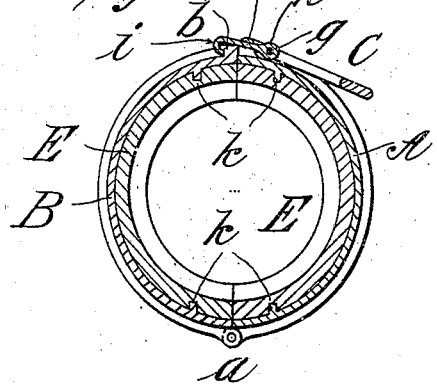
Figure 4:
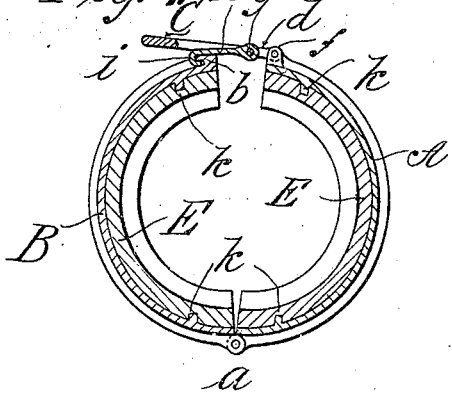

In the drawings:—Figure 1 is a perspective view of the hose jacket; Fig. 2 is an elevation of the inner side of one of the sections of the jacket, a portion of the lining of compressible material being absent; Fig. 3 is a cross sectional view as taken on line 3—3, Fig. 1,—the jacket and its closing and confining devices being represented in their closed relations. Fig. 4 is a cross sectional view similar to Fig. 3, but showing the parts as in their relations preparatory to being drawn to closed relations.

In the drawings,—A and B represent a pair of half cylindrical metallic shells edgewise connected by the hinge $a$, one thereof having adjacent its free edge an externally located and longitudinally ranging flanged or hook shaped lip $b$; and the other metallic half cylindrical section or shell has adjacent, and to swing transversely of, its free edge a lever C made in the shape of an elongated bail, the end members $d$, $d$, thereof being pivotally connected to ear lugs $f$ which are formed as parts of the shell A. A rod $g$ extends between and is connected with the opposite end members $d$ $d$ of the bail shaped lever, suitably removed from the pivotal point of such lever; and D represents a longitudinally arranged member having one edge portion thereof formed tubular, as represented at $h$ and in an encircling engagement about said rod; and this member has its other edge portion formed into a hook $i$ for engaging the said flanged lip $b$ of the other half cylindrical shell. Each half cylindrical metallic shell has inwardly turned ends $j$ and also internal longitudinal ribs $k$ and internal circumferential ribs $m$; and each so constructed shell is provided with a lining E of rubber or like compressible material, the ends of which are engaged within and protected by the inwardly turned ends $j$ of the shell,—said compressible linings moreover having anchoring engagements with the ribs $k$ and $m$.

On occasion for use of this jacket for closing a hole in a hose caused by bursting, or otherwise, while water under pressure is passing through the hose, the opened jacket is placed about the defective part of the hose, and brought to approximately closed conditions; the bail-lever carried by the one metallic shell is swung across the opening between the face edges of the two shells to permit the hook of the pivotally carried member to engage the flanged lip of the other shell, as shown in Fig. 4, whereupon the bail lever is swung to the position shown in Fig. 3, exerting a leverage for draft on the member to draw the one sheet to its closed position relatively to the other one, constricting the hose more or less and effectually preventing leakage at the place of the burst. The closing movements of the one shell relatively to the other will be completed when the bail lever is swung to the "dead center" and the disposition of the lever beyond the dead center insures the secure retention of the parts in the closed position.

I claim:—

1. In a device of the character described, the combination with a pair of semicylindrical metallic shells, means for hingedly connecting said shells to each other along one of their longitudinal edges, an external, longitudinally extending, integral lip formed along the free edge of one of said shells, a U-shaped operating handle, means for pivotally connecting the free ends of said U-shaped handle to the free edge of the other shell, a pivot rod extending between the ends of the U-shaped operating handle, and a longitudinally extending hook, one edge of which is engaged by said rod and the opposite edge of which is adapted to hook into engagement with said lip throughout the distance between the end portions of the operating handle.

2. In a device of the character described, the combination with a pair of semicylindrical metallic shells, means for hingedly connecting said shells to each other along one of their longitudinal edges, an external, longitudinally extending, integral lip formed along the free edge of one of said shells, a U-shaped operating handle, means for pivotally connecting the free ends of said U-shaped handle to the free edge of the other shell, a pivot rod extending between the ends of the U-shaped operating handle, a longitudinally extending hook, one edge of which is engaged by said rod and the opposite edge of which is adapted to hook into engagement with said lip throughout the distance between the end portions of the operating handle, and a lining of compressible material for said shells, said shells having inturned end flanges, and circumferential and longitudinally extending ribs which engage the lining to hold the same in position.

Signed by me at Springfield, Mass., in presence of two subscribing witnesses.

WILLIAM C. SHEPARD.

Witnesses:
WM. S. BELLOWS,
G. R. DRISCOLL.